United States Patent
Nobuhara et al.

(10) Patent No.: US 7,110,578 B2
(45) Date of Patent: Sep. 19, 2006

(54) ELECTRONIC DEVICE WITH USER AUTHENTICATION AND INSTRUCTION FOR FUNCTION SETTINGS WITH FINGERTIP MANIPULATION OF USER

(75) Inventors: Keiji Nobuhara, Yamatokoriyama (JP); Katsumi Nakanishi, Nara (JP); Shinsaku Tohki, Tenri (JP); Masako Yoshinaga, Yamatokoriyama (JP); Toshihiro Yamanaka, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 739 days.

(21) Appl. No.: 10/293,335

(22) Filed: Nov. 14, 2002

(65) Prior Publication Data

US 2003/0095691 A1 May 22, 2003

(30) Foreign Application Priority Data

Nov. 22, 2001 (JP) ............................. 2001-358464

(51) Int. Cl.
*G06K 9/00* (2006.01)
(52) U.S. Cl. ...................................... 382/124
(58) Field of Classification Search ................. 382/124
See application file for complete search history.

(56) References Cited

U.S. PATENT DOCUMENTS 6,111,977 A * 8/2000 Scott et al. ................. 382/124
6,148,094 A * 11/2000 Kinsella ..................... 382/124

FOREIGN PATENT DOCUMENTS

| CN | 1363910 A | 1/2001 |
|---|---|---|
| JP | 11-250251 A | 9/1999 |
| JP | 2001-143077 A | 9/1999 |
| JP | 11-296678 A | 10/1999 |
| JP | 2000-187419 | 7/2000 |
| JP | 2001-92960 A | 4/2001 |

OTHER PUBLICATIONS

Chinese Office Action and English translation thereof mailed Aug. 6, 2004 in corresponding Chinese application No. 02151495.X.
Japanese Office Action mailed Nov. 22, 2005 in corresponding Japanese patent application No. 2001-358464.

* cited by examiner

*Primary Examiner*—Joseph Mancuso
*Assistant Examiner*—Jonathan Schaffer
(74) *Attorney, Agent, or Firm*—Nixon & Vanderhye P.C.

(57) ABSTRACT

An electronic device stores a plurality of user's fingerprints in such a manner that each of a plurality of functions is stored in correspondence to any one of the fingerprints. Every time before using a function, the electronic device recognizes a user using a fingerprint corresponding to the function. For example, when the right thumb, right index finger and right middle finger are respectively stored in correspondence to an individual recognition function, imaging execution function and copy quantity setting function, at least three fingerprints are checked while the user is recognized by the electronic device, the copy quantity is set and imaging is accomplished. In such a manner that a user is multiply identified by a plurality of fingerprints during using the electronic device, the accuracy in recognizing a user and security can be enhanced with the structure as simple as the conventional one.

17 Claims, 8 Drawing Sheets

FIG. 4

| IDENTIFICATION INFORMATION | FINGERPRINT SPECIFICATION | CORRESPONDING FUNCTION |
|---|---|---|
| IDENTIFICATION INFORMATION ON ADMINISTRATOR | RIGHT THUMB | INDIVIDUAL RECOGNITION |
| | RIGHT INDEX FINGER | EXECUTION |
| | RIGHT MIDDLE FINGER | USER REGISTRATION |
| | ⋮ | ⋮ |
| | RIGHT LITTLE FINGER | COPY QUANTITY SETTING |
| IDENTIFICATION INFORMATION ON USER A | RIGHT THUMB | EXECUTION |
| | RIGHT INDEX FINGER | COPY QUANTITY SETTING |
| | RIGHT MIDDLE FINGER | INDIVIDUAL RECOGNITION |
| | ⋮ | ⋮ |
| IDENTIFICATION INFORMATION ON USER B | RIGHT THUMB | COPY QUANTITY SETTING |
| | ⋮ | ⋮ |

ELECTRONIC DEVICE WITH USER AUTHENTICATION AND INSTRUCTION FOR FUNCTION SETTINGS WITH FINGERTIP MANIPULATION OF USER

BACKGROUND OF THE INVENTION

1. Field of the Invention

The present invention relates to an electronic device capable of recognizing an individual using his fingerprint and of limiting an individual who can use the device.

2. Description of Related Art

Some of conventional electronic devices such as copying machines and printers are designed to specify or limit a user for the sake of charging the specified user for his use or bolstering security, by specifying a user. For example, Japanese Patent Application Laid-Open 2000-187419 discloses an imaging apparatus capable of specifying a user using his biological information such as his fingerprint and making an image having watermark information thereon indicating information on the specified user, which therefore can identify a user who makes ill-gotten information such as leaked classified document by the watermark information, to thereby bolster security.

The above-mentioned imaging apparatus disclosed in Japanese Patent Application Laid-Open 2000-187419 uses only one predetermined fingerprint on one of ten fingers for user identification. As a result, there arises a problem that security cannot be maintained well since the likelihood that the device errs in user recognition increases. When a device with high recognition capability is employed for recognizing a user, there arises another problem that the structure of the device becomes complex and the user-friendliness of the device decreases due to, for example, prolongation of time required for recognition.

BRIEF SUMMARY OF THE INVENTION

The present invention has been made with the aim of solving the above problems, and it is an object thereof to provide an electronic device capable of correlating each function to be executed by the electronic device to each of user's fingers and recognizing a user, who is to use a function, using one of his fingerprints corresponding to the function, with which capability of user recognition is enhanced by using a plurality of fingerprints and thereby security is bolstered with the structure as simple as the conventional one.

An electronic device according to the present invention comprises: fingerprint information storing means for storing information on fingerprints; fingerprint reading means for reading a fingerprint; and use determining means for determining permission/denial of use by comparing fingerprint information read by the fingerprint reading means with fingerprint information stored in the fingerprint information storing means. The fingerprint information storing means stores user identification information allocated to each user and information on a plurality of fingerprints related to the user identification information. Moreover, the fingerprint information storing means stores each of a plurality of functions in correspondence to any one of fingerprints related to the user identification information. The electronic device further comprises function use determining means for determining permission/denial of use of a function by comparing fingerprint information read by the fingerprint reading means with fingerprint information stored in the fingerprint information storing means in correspondence to each function.

With the invention, a plurality of fingerprints are stored in an electronic device in relation to user identification information indicating a user, and each of a plurality of functions to be executed by the electronic device is stored in correspondence to any one of the user's fingerprints. Every time before using a function, the electronic device recognizes a user using a fingerprint corresponding to the function. For example, when the right thumb, right index finger and right middle finger are respectively stored in correspondence to an individual recognition function, imaging execution function and copy quantity setting function, at least three fingerprints are checked while the user is recognized by the electronic device, the copy quantity is set and printing is accomplished. When at least one fingerprint does not accord, the electronic device does not permit use of the function required by the user. In such a manner that a user is multiply identified by a plurality of fingerprints during using the electronic device, the accuracy in recognizing a user can be enhanced. As a result, the accuracy in recognizing a user and security can be enhanced with the structure as simple as the conventional one.

In the electronic device according to the present invention, the fingerprint information storing means may set the correspondence between each function and each fingerprint for each user identification information.

With the invention, the correspondence between a function of the electronic device and a fingerprint can be arbitrarily set for each user identification information, so as to realize user-friendly usage of an electronic device such as storing the most frequently-used function in correspondence to a fingerprint on a finger which is easy for the user to use.

In the electronic device according to the present invention, the fingerprint information storing means may store process execution in correspondence to any one of a plurality of fingerprints related to the user identification information. Moreover, the electronic device according to the present invention may further comprise input accepting means for accepting input by operation of an arbitrary finger, and execution determining means which determines permission/denial of execution of a function by comparing fingerprint information read by the fingerprint reading means with fingerprint information stored in the fingerprint information storing means in correspondence to execution of the function, when the function determining means determines permission of use of the function and the input accepting means accepts input required for using the function.

With the invention, after use of a function to be executed by the electronic device is permitted, a user can use any finger, which is easy for him to use, for practical operations for using functions such as setting the copy quantity. On the other hand, for executing the function, the user has to be further recognized using a specified fingerprint. As a result, user-friendliness can be enhanced while security is maintained.

The electronic device according to the present invention may further comprise display means for displaying information, which displays a list of functions corresponding to each fingerprint of the user who has received permission for use, when the use determining means determines permission of use.

With the invention, a list of correspondence between functions and fingerprints is displayed by the display means for the user who has received permission of use. This increases the user-friendliness of the electronic device since the user can operate the device according to the display and does not have to remember the correspondence between functions and fingerprints.

In the electronic device according to the present invention, the display means may display notification of denial, when the use determining means has determined denial of use, when the function use determining means has determined denial of use of a function, or when the execution determining means has determined denial of execution of a function.

With the invention, notification of denial is displayed on the display means when the device cannot recognize a user using his fingerprint and use or execution of a function has not been permitted. This increases the user-friendliness of the electronic device since the user can easily acknowledge that he cannot use the electronic device.

In the electronic device according to the present invention, the input accepting means may comprise a change key for accepting an instruction for changing information displayed on the display means.

With the invention comprising a change key for accepting an instruction for changing information displayed on the display means through operation by the user so as to allow the user to select necessary information on a function to be executed or the like, the operation is simplified and the operation unit can be further downsized.

In the electronic device according to the present invention, the display means may be constituted of a touch panel. Moreover, a part of the input accepting means including the change key may accept input through the touch panel.

With the invention, display means and a part of the input accepting means including the change key are constituted of a touch panel, so that the operation is simplified and the operation unit can be further downsized.

The electronic device according to the present invention may further comprise fingerprint registering means for causing the fingerprint information storing means to store information on fingerprints of a user. In this case, the fingerprint information storing means stores administrator identification information allocated to an administrator, and stores a function for using the fingerprint registering means in correspondence to any one of a plurality of fingerprints related to the administrator identification information.

In the electronic device according to the present invention, the fingerprint information storing means may store fingerprint information related to administrator identification information before storing fingerprint information related to user identification information.

Moreover, in the electronic device according to the present invention, the fingerprint registering means may cause the fingerprint information storing means to store fingerprint information read by the fingerprint reading means in relation to user identification information after the function use determining means determines permission of use.

With the invention, a fingerprint related to administrator identification information allocated to an administrator is stored in correspondence to a function for registering fingerprints of a user. The function is executed through an operation by the administrator, so that fingerprints of other users can be registered. With this structure in which fingerprints of an administrator are registered before registering fingerprints of users, immoderate registration of users is prevented and users are limited, so that security can be bolstered.

The above and further objects and features of the invention will more fully be apparent from the following detailed description with accompanying drawings.

BRIEF DESCRIPTION OF THE SEVERAL VIEWS OF THE DRAWINGS

FIG. 4 is a conceptual diagram showing an example of content of correspondence information stored in a fingerprint information storing unit;

DETAILED DESCRIPTION OF THE INVENTION

The following description will explain the present invention in detail with reference to the drawings illustrating an embodiment thereof.

Figure 1:
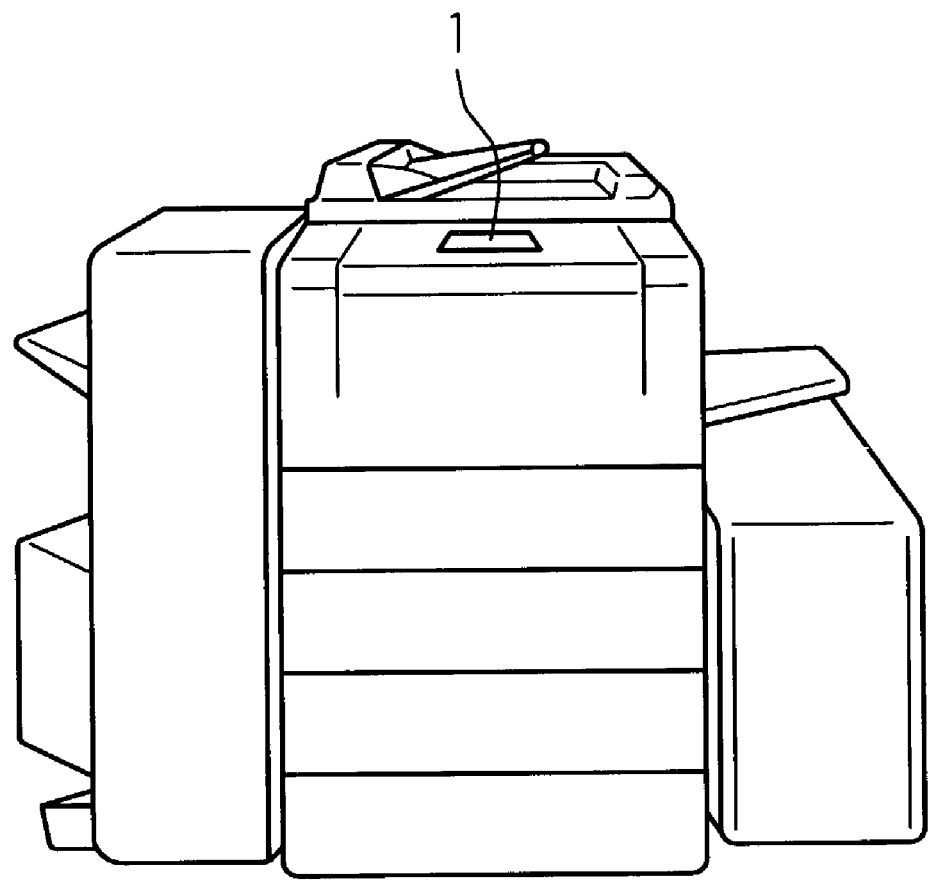
FIG. 1 is an external view of an electronic device according to the present invention.

FIG. 1 is an external view of an electronic device according to the present invention. The electronic device of this embodiment is a copying machine, and has functions for reading contents on the original paper to be copied, copying the contents to copier paper and discharging the copier paper. The electronic device has an operation unit 1 at the front face thereof and accepts an instruction for copying or the like through operations by a user. It should be noted that the electronic device of the present invention may be a printer which is connected to an outer apparatus such as a personal computer which is not illustrated in the figure so as to make an image on copier paper based on information received from the outer apparatus; a facsimile machine connected to a public circuit; a complex machine including the above printer, facsimile machine and a copying machine; or the like.

Figure 2:
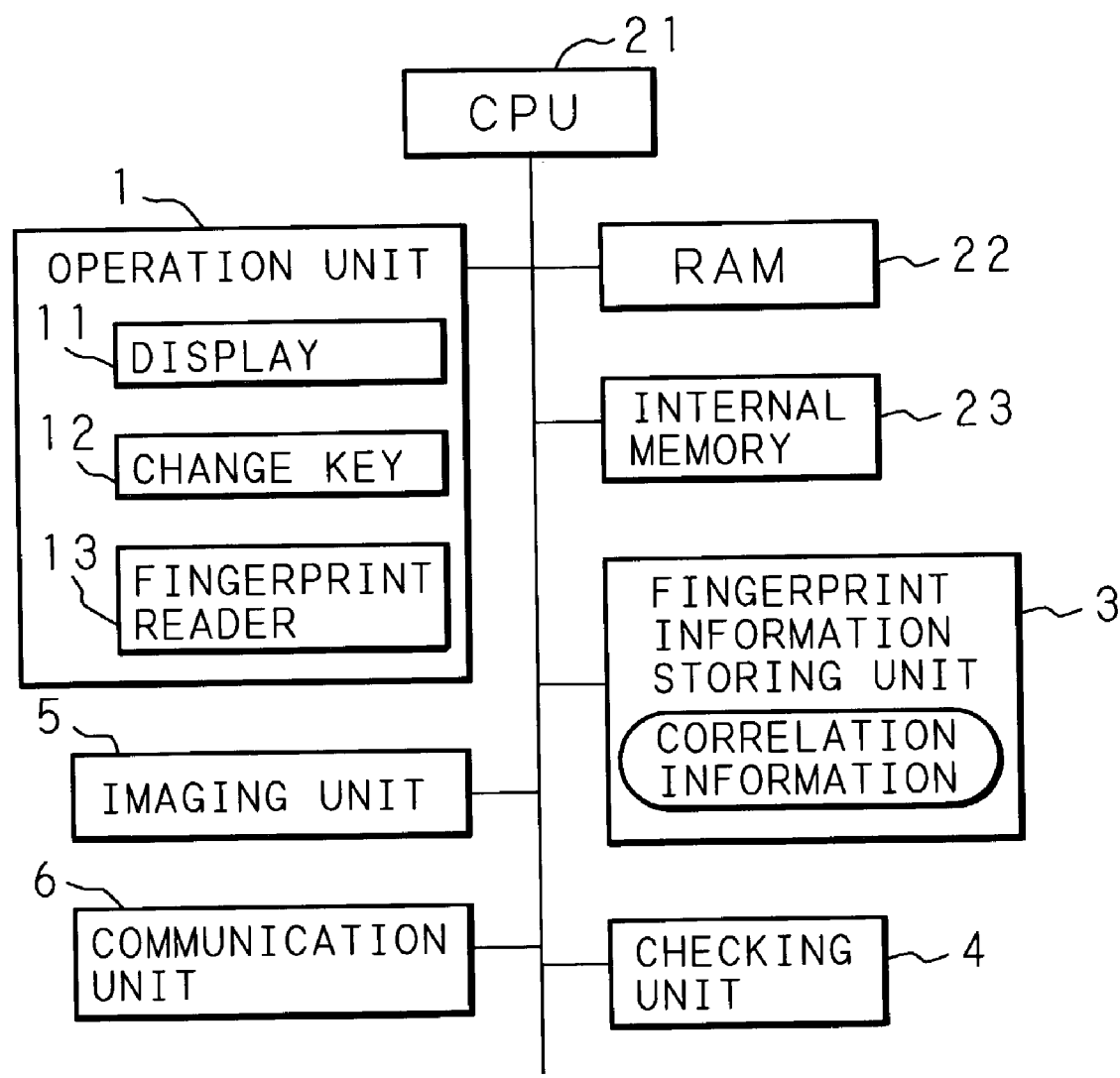
FIG. 2 is a block diagram showing the internal structure of the electronic device of the invention.

FIG. 2 is a block diagram showing the internal structure of the electronic device according to the present invention. The electronic device has a CPU 21; a RAM 22; an internal memory 23 such as a ROM or a hard disk; and an imaging unit 5 for realizing a main function of the electronic device which reads contents of the original and makes an image. The CPU 21 loads a program stored in the internal memory 23 into the RAM 22 to control the electronic device. The CPU 21 is connected with the operation unit 1; a fingerprint information storing unit 3 for storing information on fingerprint of a user; and a checking unit 4 for checking fingerprint information. The operation unit 1 has a fingerprint reader 13 for reading a fingerprint of a user. The checking unit 4 compares fingerprint information read by the fingerprint reader 13 with fingerprint information stored in the fingerprint information storing unit 3 and determines whether the two pieces of fingerprint information accord with each other within a preset range of check accuracy or not. The CPU 21 may be further connected with a communication unit 6 for communicating with an outer apparatus or communications network which is not illustrated in the figure.

Figure 3A:
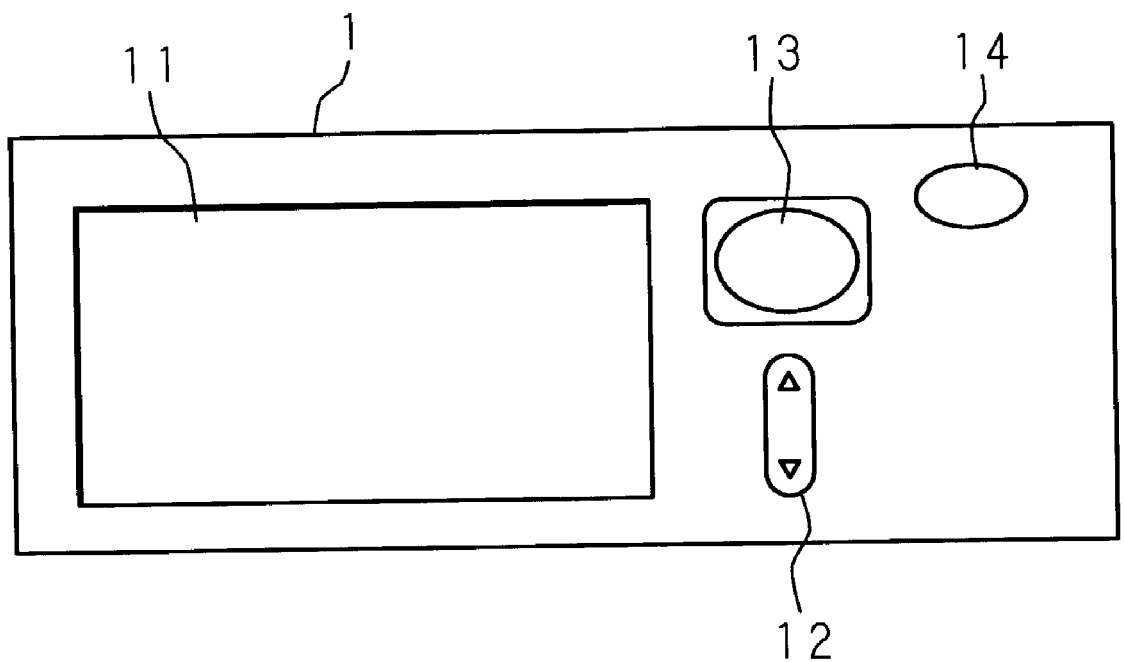
FIGS. 3A and 3B are schematic views illustrating an example of external appearance of an operation unit.
Figure 3B:
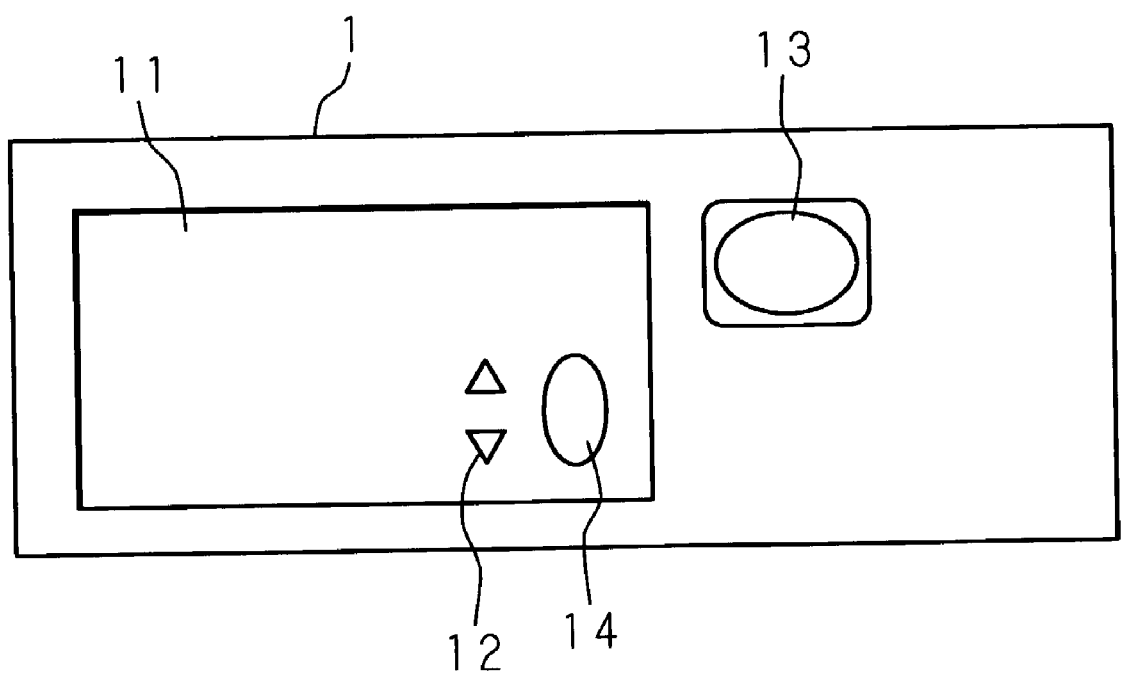

FIGS. 3A and 3B are schematic views illustrating an example of external appearance of the operation unit 1. As shown in FIG. 3A, the operation unit 1 has a display 11 such as a liquid crystal panel; a fingerprint reader 13 for reading a fingerprint of user's finger pressed thereon; a change key 12 for accepting an instruction for changing information displayed on the display 11 by, for example, scrolling the information; and a clear key 14 used for canceling an operation by a user. With this structure in which information is displayed on the display 11, necessary information such as operation content is selected by the change key 12 and operation content is decided by accepting a fingerprint through the fingerprint reader 13, the operation is simplified and the operation unit 1 can be downsized. It should be noted that, as shown in FIG. 3B, the display 11, change key 12 and clear key 14 may be integrally constructed using a touch panel. In this case, the operation unit 1 can be further downsized. Alternatively, the display 11 may be enlarged while the size of the operation unit 1 is maintained, so that the display 11 can be eye-friendly one and the operation can be simplified.

The fingerprint information storing unit 3 stores information on a plurality of fingerprints in relation to user identification information allocated to a user, and furthermore, stores correspondence information on each of a plurality of fingerprints corresponding to each of a plurality of functions to be executed by the electronic device. FIG. 4 is a conceptual diagram showing an example of content of correspondence information stored in the fingerprint information storing unit 3. Administrator identification information allocated to an administrator is stored, a plurality of fingerprints are stored in relation to the administrator identification information, and each function of the electronic device is stored in correspondence to each fingerprint, such as right thumb for an individual recognition function, and right index finger for execution of copying or the like. Moreover, user identification information allocated to a plurality of users other than the administrator is stored, and a plurality of fingerprints related to the user identification information are stored in correspondence to functions of the electronic device. The correspondence between fingerprints and functions can be arbitrarily set for each user. An administrating function for administrating the electronic device including a user registration function is stored in correspondence only to a fingerprint related to the administrator identification information. It should be noted that function contents of the electronic device corresponding to fingerprints are arbitrarily selected depending on the structure of the electronic device, however, an individual recognition function and an execution function are necessary for the device. The checking unit 4 compares fingerprint information read by the fingerprint reader 13 with fingerprint information stored in the fingerprint information storing unit 3. The CPU 21 determines permission/denial of use of the electronic device on the basis of the result of checking a fingerprint corresponding to an individual recognition function, determines permission/denial of use of a function on the basis of the result of checking a fingerprint corresponding to each function, and determines permission/denial of execution of a function on the basis of the result of checking a fingerprint corresponding to execution.

Figure 5:
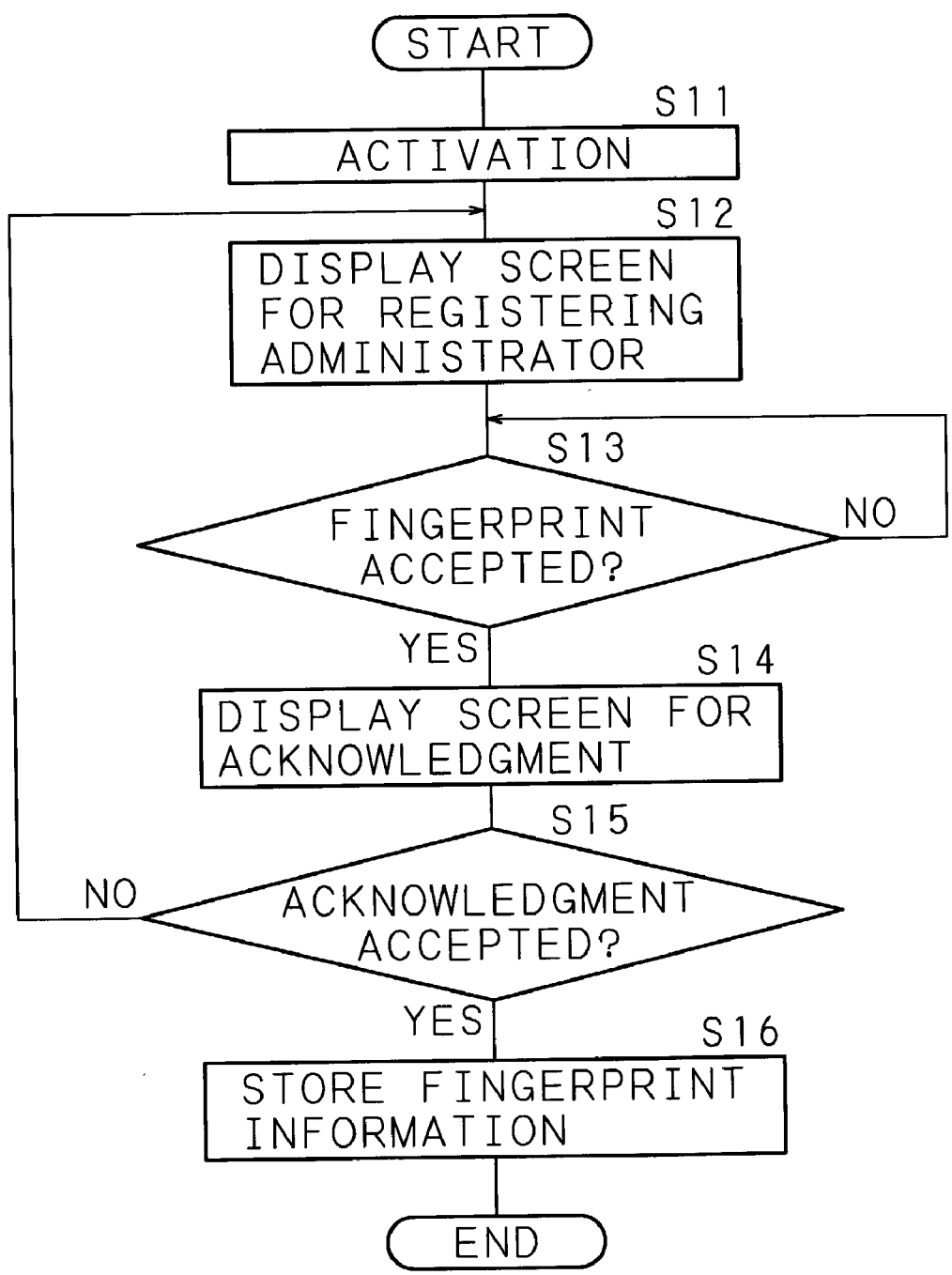
FIG. 5 is a flow chart showing the processing procedure for registering a fingerprint of an administrator, which is performed by the electronic device of the invention.

FIG. 5 is a flow chart showing the processing procedure for registering a fingerprint of an administrator, which is performed by the electronic device of the invention. First, when the electronic device is activated in a state where no fingerprint of any user is registered (step S11), the electronic device displays a screen for registering an administrator on the display 11 (step S12). The electronic device then monitors acceptance of a fingerprint of an individual to be an administrator according to the displayed information at the fingerprint reader 13 (step S13). When no fingerprint is accepted, the electronic device continues monitoring acceptance of a fingerprint, while, when a fingerprint is accepted, the electronic device displays a message on the display 11 requesting to acknowledge whether the user should be registered as an administrator or not (step S14). The electronic device monitors acknowledgment of administrator registration at the operation unit 1 by, for example, monitoring whether specification on "acknowledgment" displayed on the display 11 through operation by the above individual using the change key 12 is accepted or not (step S15). When no acknowledgment of administrator registration is accepted, or when specification on "cancel" displayed on the display 11 is accepted, the process goes back to the step S12. On the other hand, when acknowledgment of administrator registration is accepted, the electronic device stores the accepted fingerprint information in the fingerprint information storing unit 3 in relation to administrator identification information (step S16), and the process ends.

Figure 6:
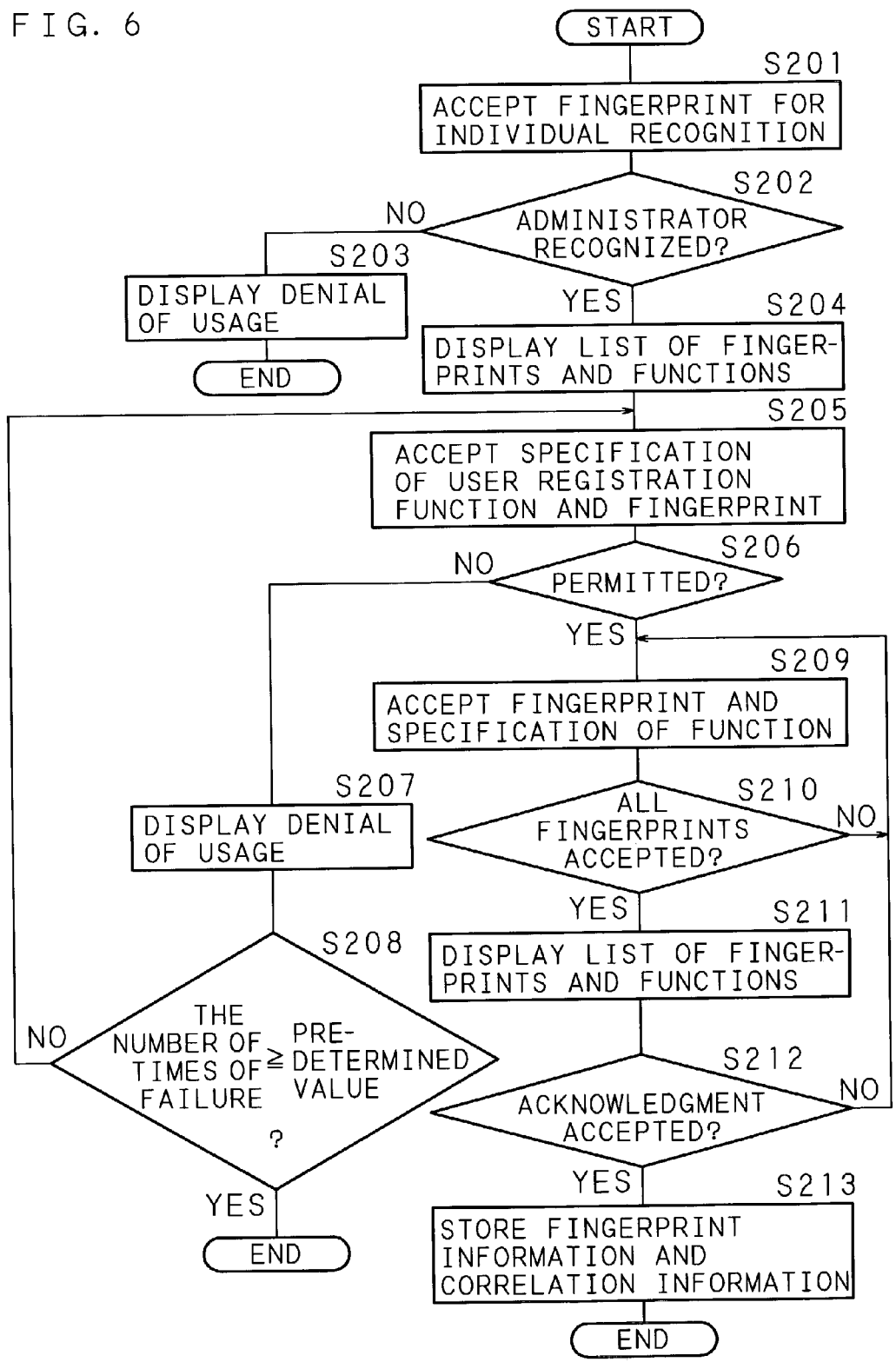
FIG. 6 is a flow chart showing the processing procedure for registering a fingerprint of a user, which is performed by the electronic device of the invention.

FIG. 6 is a flow chart showing the processing procedure for registering a fingerprint of a user, which is performed by the electronic device of the invention. An administrator presses one of his fingerprints corresponding to an individual recognition function on the fingerprint reader 13 for the sake of using an administration function of the electronic device, and the electronic device accepts the fingerprint for individual recognition through the fingerprint reader 13 (step S201). The electronic device compares the fingerprint information read by the fingerprint reader 13 with the fingerprint information stored in the fingerprint information storing unit 3 at the checking unit 4 to determine whether the recognition of an administrator should be accomplished or not by the CPU 21 on the basis of whether the two pieces of fingerprint information accord with each other within a preset range of check accuracy or not (step S202). When the two pieces of fingerprint information do not accord with each other and no administrator is recognized, the electronic device displays a message on the display 11 for notifying denial of use of an administration function (step S203), and the process ends. When the two pieces of fingerprint information accord with each other and an administrator is recognized, the electronic device displays a list of correspondence between each fingerprint of the administrator and each function to be executed by the electronic device such as an administration function (step S204).

The electronic device then accepts specification of a user registration function through the operation unit 1, which function is selected by the administrator from the displayed list using the change key 12. The electronic device further accepts a fingerprint corresponding to a user registration function through the fingerprint reader 13 (step S205). The electronic device checks the fingerprint information at the checking unit 4 to allow the CPU 21 to determine whether use of the user registration function should be permitted or not (step S206). When the two pieces of fingerprint information do not accord with each other and use of the user registration function is not permitted, the electronic device displays a message on the display 11 for notifying denial of use of the user registration function (step S207), and determines at the CPU 21 whether the number of times fingerprint check ended in a failure has come to a predetermined value such as three successive times or not (step S208). When the number of times fingerprint check ended in a failure has not come to a predetermined value, the process goes back to the step S205, while, when the number of times of failure has come to a predetermined value, the process ends.

When the two pieces of fingerprint information accord with each other and use of the user registration function is permitted at the step S206, the electronic device accepts a fingerprint of an individual to be a user other than the administrator through the fingerprint reader 13, and further accepts specification of a function corresponding to the accepted fingerprint through the operation unit 1 (step S209). The electronic device then determines whether all of the fingerprints of the individual have been accepted or not (step S210). When there is a fingerprint of the individual which has not been accepted, the process goes back to the step S209 and continues accepting a fingerprint. When all of the fingerprints of the individual have been accepted, the electronic device displays a list of correspondence between the accepted fingerprint and a function on the display 11 (step S211), and then monitors acceptance of acknowledgment for user registration by the individual through the operation unit 1 (step S212). When no acknowledgment is accepted, the process goes back to the step S209. When acknowledgment is accepted, the electronic device stores the accepted fingerprint information in the fingerprint information storing unit 3 in relation to user identification information allocated to the individual, and further stores correspondence information indicating the correspondence between fingerprints and functions (step S213). The process then ends.

Figure 7:
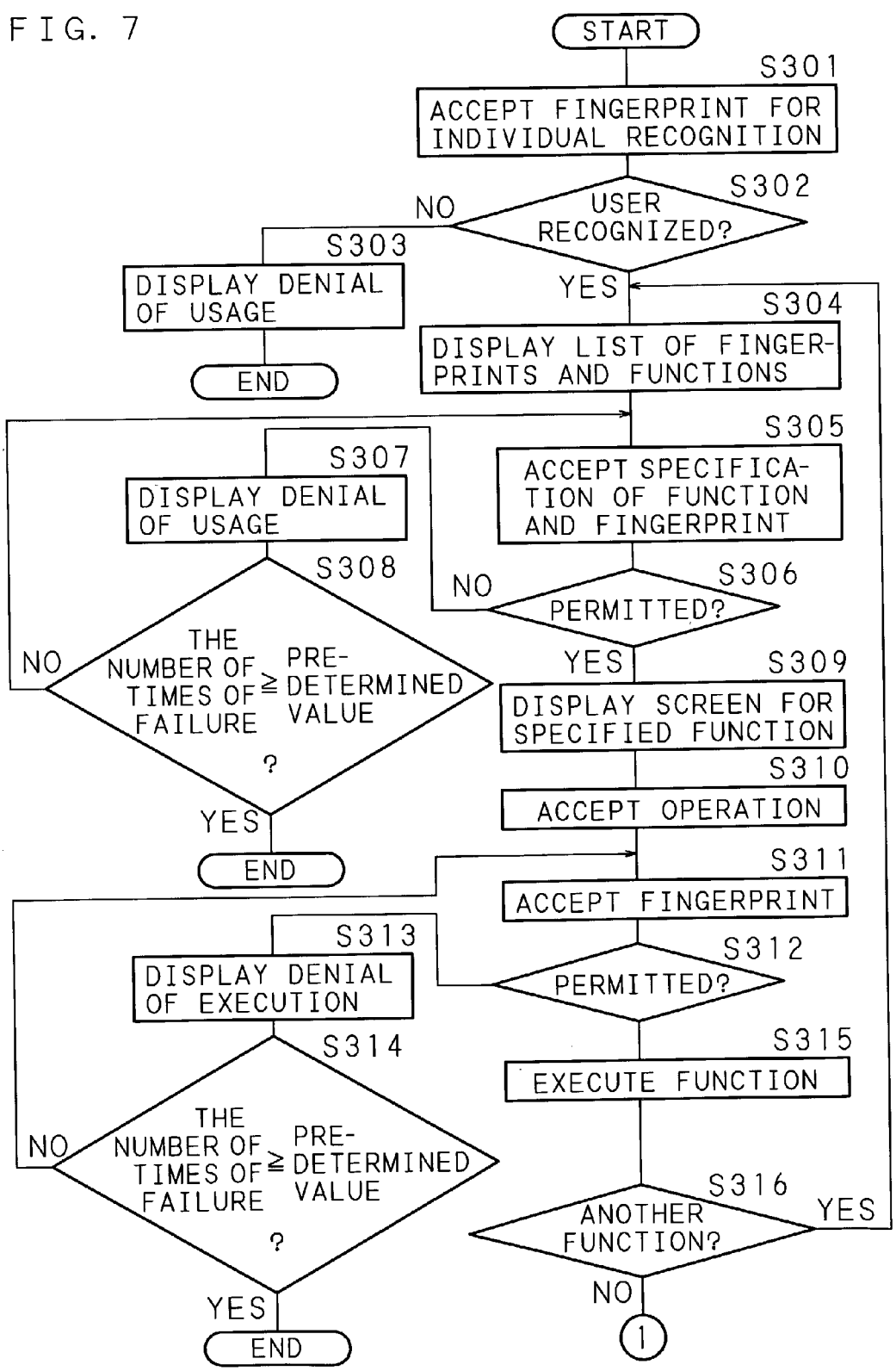
FIGS. 7 and 8 are flow charts showing the processing procedure for imaging, which is performed by the electronic device of the invention.
Figure 8:
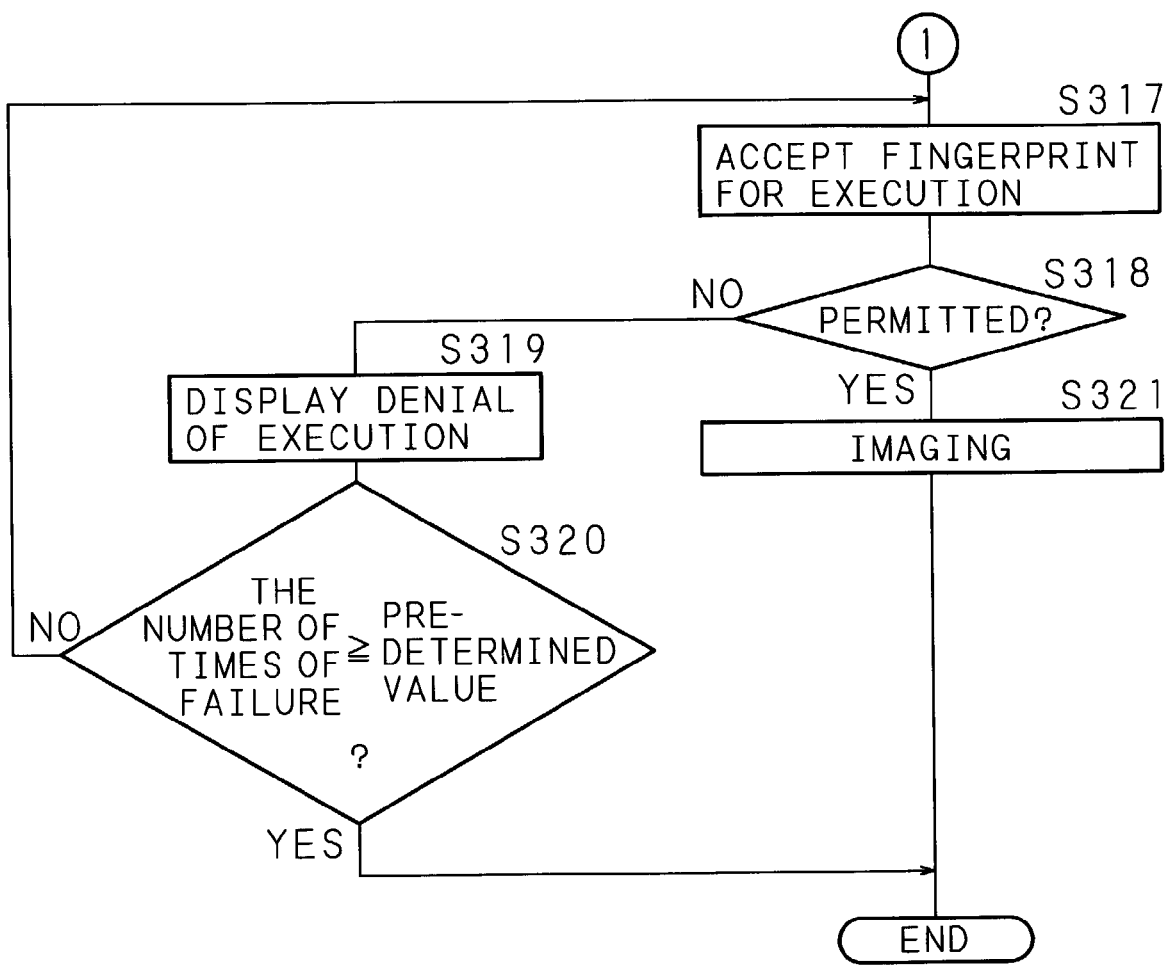

FIGS. 7 and 8 are flow charts showing the processing procedure for imaging, which is performed by the electronic device of the invention. A user presses one of his fingerprints corresponding to an individual recognition function on the fingerprint reader 13 for the sake of using the electronic device, and the electronic device accepts the fingerprint for individual recognition through the fingerprint reader 13 (step S301). The electronic device compares the fingerprint information read by the fingerprint reader 13 with the fingerprint information stored in the fingerprint information storing unit 3 at the checking unit 4 to allow the CPU 21 to determine whether the recognition of a user should be accomplished or not on the basis of whether the two pieces of fingerprint information accord with each other within a preset range of check accuracy or not (step S302). When the two pieces of fingerprint information do not accord with each other and no user is recognized, the electronic device displays a message on the display 11 for notifying denial of use of the electronic device (step S303), and the process ends. When the two pieces of fingerprint information accord with each other and a user is recognized, the electronic device displays a list of correspondence between each fingerprint of the user and each function to be executed by the electronic device such as an administration function (step S304).

The electronic device then accepts specification of a function to be used such as a copy quantity setting function through the operation unit 1, which function is selected by the user from the displayed list using the change key 12. The electronic device further accepts a fingerprint corresponding to the specified function through the fingerprint reader 13 (step S305). The electronic device checks the fingerprint information at the checking unit 4 to allow the CPU 21 to determine whether use of the specified function should be permitted or not (step S306). When the two pieces of fingerprint information do not accord with each other and use of the specified function is not permitted, the electronic device displays a message on the display 11 for notifying denial of use of the specified function (step S307), and determines at the CPU 21 whether the number of times fingerprint check ended in a failure has come to a predetermined value such as three successive times or not (step S308). When the number of times fingerprint check ended in a failure has not come to a predetermined value, the process goes back to the step S305, while, when the number of times of failure has come to a predetermined value, the process ends.

When the two pieces of fingerprint information accord with each other and use of the specified function is permitted at the step S306, the electronic device displays an operation screen for the specified function on the display 11, such as a screen for accepting copy quantity setting (step S309), and accepts operation of the user using an arbitrary finger through the operation unit 1 (step S310). For example, the user operates the change key 12 to change a value displayed on the display 11 indicating the number of copies to set the copy quantity. The electronic device then accepts a fingerprint corresponding to execution through the fingerprint reader 13 for the sake of executing the function (step S311). The electronic device checks the accepted fingerprint information at the checking unit 4 to allow the CPU 21 to determine whether execution of the function should be permitted or not (step S312). When the two pieces of fingerprint information do not accord with each other and execution is not permitted, the electronic device displays a message on the display 11 for notifying denial of execution of the function (step S313), and determines at the CPU 21 whether the number of times fingerprint check ended in a failure has come to a predetermined value or not (step S314). When the number of times fingerprint check ended in a failure has not come to a predetermined value, the process goes back to the step S311, while, when the number of times of failure has come to a predetermined value, the process ends.

When the two pieces of fingerprint information accord with each other and execution of the function is permitted at the step S312, the electronic device executes the function according to the accepted operation such as copy quantity setting (step S315). The electronic device then accepts selection whether another function is to be used or not through the operation unit 1 (step S316). When selection indicating use of another function is accepted, the process goes back to the step S304. When use of another function is not accepted, the electronic device accepts a fingerprint corresponding to execution through the fingerprint reader 13 for the sake of imaging (step S317), and checks the fingerprint information at the checking unit 4 to allow the CPU 21 to determine whether execution of imaging should be permitted or not (step S318). When the two pieces of fingerprint information do not accord with each other and execution is not permitted, the electronic device displays a message on the display 11 for notifying denial of execution (step S319), and determines at the CPU 21 whether the number of times fingerprint check ended in a failure has come to a predetermined value or not (step S320). When the number of times fingerprint check ended in a failure has not come to a predetermined value, the process goes back to the step S317, while, when the number of times of failure has come to a predetermined value, the process ends. When two pieces of fingerprint information accord with each other and execution is permitted at the step S318, the electronic device executes an imaging process such as copying at the imaging unit 5 (step S321), and the process ends.

As described above in detail, since the electronic device according to the present invention stores each of a plurality of functions in correspondence to any one of a plurality of user's fingerprints, the user is required to have some of his fingerprints read before obtaining an image. Consequently, the electronic device multiply identifies a user by a plurality of fingerprints. As a result, the invention does not need a complex fingerprint checking unit for bolstering security using a single fingerprint, but needs only a fingerprint checking unit as simple as the conventional one for enhancing accuracy in recognizing users and bolstering security.

Since the correspondence between functions and fingerprints is arbitrarily allocated for each user, user-friendly allocation for each user can be accomplished in such a manner that a function which is frequently used by a user is stored in correspondence to a fingerprint of a finger which is easy for the user to use. This enhances the user-friendliness of the electronic device. Moreover, since specific operations such as input of copy quantity can be operated with an arbitrary finger while execution of a function requires further input of a specified fingerprint, the invention enhances the user-friendliness while maintaining security.

Since a list of the correspondence between functions and fingerprints is displayed on the display 11, the user can easily recognize a required operation and the user-friendliness of the electronic device is enhanced. Moreover, since a message notifying denial is displayed on the display 11 when the read fingerprint does not accord with the stored fingerprint, the user can easily recognize that he cannot use the electronic device, and the user-friendliness of the electronic device is enhanced.

Furthermore, since an administrator is registered before a user is registered and a fingerprint of the administrator is stored in correspondence to a function for registering fingerprints of a user, user registration is limited to prevent immoderate increase of users, so that security can be bolstered.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A document processing electronic device comprising:
    a fingerprint information storing unit for storing information on fingerprints, which stores user identification information allocated to each of a plurality of users and information on a plurality of fingerprints related to the user identification information so that the fingerprint information storing unit stores a plurality of different fingerprints corresponding to a plurality of different fingers of a given user,
    wherein the plurality of different fingerprints of the given user are stored in correspondence to a plurality of different corresponding functions of the document processing electronic device;
    a fingerprint reader for reading a fingerprint;
    a use determining unit for determining permission/denial of use by comparing fingerprint information read by the fingerprint reader with fingerprint information stored in the fingerprint information storing unit; and
    a function use determining unit for determining permission/denial of use of a function by comparing fingerprint information read by the fingerprint reader with fingerprint information stored in the fingerprint information storing unit in correspondence to each function so that for the given user access to a first function of the document processing electronic device requires a substantial match of input fingerprint information with stored fingerprint information of a first finger of the user, and access to a different second function of the document processing electronic device requires a substantial match of input fingerprint information with stored fingerprint information of a second finger of the user.

2. The electronic device according to claim 1, wherein the fingerprint information storing unit sets correspondence between each function and each fingerprint for each user identification information.

3. The electronic device according to claim 2, wherein the fingerprint information storing unit stores process execution in correspondence to any one of a plurality of fingerprints related to the user identification information, further comprising:
    an input accepting unit for accepting input through operation with an arbitrary finger; and
    an execution determining unit which determines permission/denial of execution of a function by comparing fingerprint information read by the fingerprint reader with fingerprint information stored in the fingerprint information storing unit in correspondence to execution of the function, when the function determining unit determines permission of use of the function and the input accepting unit accepts input required for using the function.

4. The electronic device according to claim 2, further comprising a fingerprint registering unit for causing the fingerprint information storing unit to store information on fingerprints of a user, wherein the fingerprint information storing unit stores administrator identification information allocated to an administrator, and stores a function for using the fingerprint registering unit in correspondence to any one of a plurality of fingerprints related to the administrator identification information.

5. The electronic device according to claim 1, wherein the fingerprint information storing unit stores process execution in correspondence to any one of a plurality of fingerprints related to the user identification information, further comprising:
    an input accepting unit for accepting input through operation with an arbitrary finger; and
    an execution determining unit which determines permission/denial of execution of a function by comparing fingerprint information read by the fingerprint reader with fingerprint information stored in the fingerprint information storing unit in correspondence to execution of the function, when the function determining unit determines permission of use of the function and the input accepting unit accepts input required for using the function.

6. The electronic device according to claim 5, further comprising a display for displaying information, which displays a list of functions corresponding to each fingerprint of the user who has received permission for use, when the use determining unit determines permission of use.

7. The electronic device according to claim 6, wherein the display displays notification of denial when the use determining unit has determined denial of use, displays notification of denial when the function use determining unit has determined denial of use of a function, and displays notification of denial when the execution determining unit has determined denial of execution of a function.

8. The electronic device according to claim 6, wherein the input accepting unit comprises a change key for accepting an instruction for changing information displayed on the display.

9. The electronic device according to claim 8, wherein the display is constituted of a touch panel, and a part of the input accepting unit including the change key accepts input through the touch panel.

10. The electronic device according to claim 5, further comprising a fingerprint registering unit for causing the fingerprint information storing unit to store information on fingerprints of a user, wherein the fingerprint information storing unit stores administrator identification information allocated to an administrator, and stores a function for using the fingerprint registering unit in correspondence to any one of a plurality of fingerprints related to the administrator identification information.

11. The electronic device according to claim 1, further comprising a fingerprint registering unit for causing the fingerprint information storing unit to store information on fingerprints of a user, wherein the fingerprint information storing unit stores administrator identification information allocated to an administrator, and stores a function for using the fingerprint registering unit in correspondence to any one of a plurality of fingerprints related to the administrator identification information.

12. The electronic device according to claim 11, wherein the fingerprint information storing unit stores fingerprint information related to administrator identification information before storing fingerprint information related to user identification information.

13. The electronic device according to claim 11, wherein the fingerprint registering unit causes the fingerprint information storing unit to store fingerprint information read by the fingerprint reader in relation to user identification information after the function use determining unit determines permission of use.

14. A document processing electronic device comprising:
fingerprint information storing means for storing information on fingerprints, which stores user identification information allocated to each user and information on a plurality of fingerprints related to the user identification information, each of the fingerprints being stored in correspondence to each of a plurality of functions so that the fingerprint information storing means stores a plurality of different fingerprints corresponding to a plurality of different fingers of a given user, and wherein the plurality of different fingerprints of the given user are stored in correspondence to a plurality of different functions of the device;
fingerprint reading means for reading a fingerprint;
use determining means for determining permission/denial of use by comparing fingerprint information read by the fingerprint reading means with fingerprint information stored in the fingerprint information storing means; and
function use determining means for determining permission/denial of use of a function by comparing fingerprint information read by the fingerprint reading means with fingerprint information stored in the fingerprint information storing means in correspondence to each function so that for the given user access to a first function of the document processing electronic device requires a substantial match of input fingerprint information with stored fingerprint information of a first finger of the user, and access to a different second function of the document processing electronic device requires a substantial match of input fingerprint information with stored fingerprint information of a second finger of the user.

15. The electronic device according to claim 14, wherein the fingerprint information storing means sets correspondence between each function and each fingerprint for each user identification information.

16. The electronic device according to claim 14, wherein the fingerprint information storing means stores process execution in correspondence to any one of a plurality of fingerprints related to the user identification information, further comprising:
input accepting means for accepting input through operation with an arbitrary finger; and
execution determining means which determines permission/denial of execution of a function by comparing fingerprint information read by the fingerprint reading means with fingerprint information stored in the fingerprint information storing means in correspondence to execution of the function, when the function determining means determines permission of use of the function and the input accepting means accepts input required for using the function.

17. The electronic device according to claim 14, further comprising fingerprint registering means for causing the fingerprint information storing means to store information on fingerprints of a user, wherein the fingerprint information storing means stores administrator identification information allocated to an administrator, and stores a function for using the fingerprint registering means in correspondence to any one of a plurality of fingerprints related to the administrator identification information.

* * * * *